US012717406B2

(12) United States Patent
Mansour et al.

(10) Patent No.: US 12,717,406 B2
(45) Date of Patent: Aug. 25, 2026

(54) COMPUTING UNIT FOR ASCERTAINING THE VIEWING VECTOR OF A USER OF SMART GLASSES

(71) Applicant: Robert Bosch GmbH, Stuttgart (DE)

(72) Inventors: Ahmad Mansour, Sindelfingen (DE); Johannes Meyer, Haseluenne (DE); Stefan Gering, Erdmannhausen (DE); Thomas Alexander Schlebusch, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/837,630

(22) PCT Filed: Apr. 6, 2023

(86) PCT No.: PCT/EP2023/059128
§ 371 (c)(1),
(2) Date: Aug. 12, 2024

(87) PCT Pub. No.: WO2023/222303
PCT Pub. Date: Nov. 23, 2023

(65) Prior Publication Data

US 2025/0147583 A1 May 8, 2025

(30) Foreign Application Priority Data

May 17, 2022 (DE) ..................... 10 2022 204 848.2

(51) Int. Cl.
*G06F 3/01* (2006.01)
*G06T 7/20* (2017.01)
*G06T 7/70* (2017.01)

(52) U.S. Cl.
CPC ................ *G06F 3/013* (2013.01); *G06T 7/20* (2013.01); *G06T 7/70* (2017.01)

(58) Field of Classification Search
CPC .............. G06F 3/013; G06T 7/70; G06T 7/20
See application file for complete search history.

(56) References Cited

U.S. PATENT DOCUMENTS 10,852,817 B1 12/2020 Ouderkirk et al.
2016/0364881 A1* 12/2016 Mallinson ................. G06T 7/20
(Continued)

FOREIGN PATENT DOCUMENTS

DE 102020127593 A1 4/2022
DE 102021207058 A1 1/2023
(Continued)

OTHER PUBLICATIONS

International Search Report for PCT/EP2023/059128, Issued Jun. 26, 2023.
(Continued)

*Primary Examiner* — Scott D Au
(74) *Attorney, Agent, or Firm* — NORTON ROSE FULBRIGHT US LLP

(57) ABSTRACT

A computing unit for ascertaining the viewing vector of a user of smart glasses. The computing unit receives first image data recorded using a first sensor unit at a first time interval and generates a respective image of an eye of the user based on the recorded first image data. The computing unit ascertains first rotational speed data of the user's eye which is recorded using a second sensor unit at a second time interval shorter than the first time interval. The computing unit ascertains a first viewing vector information of the user of the smart glasses based on the generated image of the eye and ascertains at least one second viewing vector information of the eye based on the received first rotational speed data of the eye. The computing unit ascertains the viewing vector of the eye based on the ascertained first and/or second viewing vector information.

17 Claims, 5 Drawing Sheets

(56) References Cited

U.S. PATENT DOCUMENTS

2020/0026350 A1* 1/2020 Eash ........................ G06F 3/013
2022/0121279 A1 4/2022 Petersen et al.

FOREIGN PATENT DOCUMENTS

WO 2018064141 A1 4/2018
WO 2022084092 A1 4/2022

OTHER PUBLICATIONS

Meyer, "Towards Energy Efficient Mobile Eye Tracking for AR Glasses Through Optical Sensor Technology," Cornell University, 2022, pp. 1-276.
Meyer, et al.: A compact low-power gaze gesture sensor based on laser feedback interferometry for smart glasses, Digital Optical Technol. (2021), Proc. of SPIE vol. 11788; pp. 11788D1-11788D13.

* cited by examiner

COMPUTING UNIT FOR ASCERTAINING THE VIEWING VECTOR OF A USER OF SMART GLASSES

FIELD

The present invention relates to a computing unit for ascertaining a viewing vector of a user of smart glasses. In addition, the present invention relates to an optical system for ascertaining a viewing vector of a user of smart glasses and to smart glasses comprising the optical system. The present invention also relates to a method for ascertaining a viewing vector of a user of smart glasses.

BACKGROUND INFORMATION

An optical system is described in U.S. Pat. No. 10,852,817 B1 which uses a camera system to generate several images of the eye of the user of the smart glasses and to ascertain therefrom the user's viewing vector, for example.

Proceeding from this starting point, an object of the present invention includes developing a computing unit which enables the viewing vector to be ascertained in a more energy-saving manner.

SUMMARY

To attain the object, a computing unit for ascertaining a viewing vector of a user of smart glasses according to features of the present invention is provided. In addition, an optical system for ascertaining a viewing vector of a user of smart glasses and smart glasses are provided according to the present invention. In addition, a method for ascertaining a viewing vector of a user of smart glasses is provided according to the present invention.

According to an example embodiment of the present invention, the computing unit for ascertaining a viewing vector of a user of a pair of smart glasses is designed to receive first image data recorded at a first time interval by means of a first sensor unit and to generate at least one image of an eye of the user on the basis of the recorded first image data. The first time interval refers in particular to a first time range or, in other words, a sample rate or points in time at which the computing unit receives the received image data. By means of the computing unit, at a first point in time, the image data recorded first are received, and at a second point in time the subsequently recorded image data are received. The two points in time have the first time interval between them. In addition, the computing unit is designed to receive first rotational speed data of the user's eye recorded at a second time interval by means of a second sensor unit. The first rotational speed data of the user's eye refers in particular to the eye surface speeds of the eye. These angular speeds are determined in particular using the surface intersection points and a link between the head-fixed coordinate system and the coordinate system of the pair of glasses. The second time interval is smaller, in particular significantly smaller, than the first time interval. In principle, the imaging, energy-intensive first sensor unit can therefore be operated in a kind of power-saving mode, while the energy-saving second sensor unit records sensor data at short intervals. The second time interval refers in particular to a second time range or, in other words, a sample rate or points in time at which the computing unit receives the first rotational speed data. The first time interval refers in particular to a first time range or, in other words, a sample rate or points in time at which the computing unit receives the received image data. By means of the computing unit, at a third point in time, the rotational speed data recorded first are received, and at a fourth point in time the subsequently recorded rotational speed data are received. The two points in time have the second time interval between them. The computing unit is also designed to ascertain at least a first viewing vector information of the user of the smart glasses on the basis of the generated images of the user's eye and at least a second viewing vector information of the user's eye on the basis of the received first rotational speed data of the user's eye. The first and/or second viewing vector information refers to any information or any data that provides conclusions about the user's viewing vector and/or can be used to ascertain the viewing vector. Furthermore, the computing unit is designed to ascertain the viewing vector of the user's eye on the basis of the first and/or second viewing vector information ascertained. The use of viewing vector information from two different sensor units makes the ascertaining of the viewing vector less susceptible to sensor errors. In addition, the relatively short second time intervals compared to the first time intervals make possible an energy-saving ascertaining of the viewing vector.

Preferably, according to an example embodiment of the present invention, the computing unit is designed to receive additional first interval information of the second sensor unit relative to the user's eye that is recorded by the second sensor unit at the second time interval. The first interval information refers in particular to the first interval values of the second sensor unit relative to the user's eye. The computing unit is designed to ascertain the at least one second viewing vector information of the user's eye on the basis of the received first rotational speed data and the received first interval information of the second sensor unit relative to the user's eye.

Preferably, according to an example embodiment of the present invention, the computing unit is designed to additionally ascertain the first viewing vector information on the basis of the received first rotational speed data and/or the received first interval information of the second sensor unit relative to the user's eye. The first viewing vector information can also refer to a 3D eye model.

Geometric properties of the eye model, such as the diameter of the eyeball, can be ascertained from the received first rotational speed data and/or the received first interval information of the second sensor unit. This allows the 3D eye model to be adapted to the respective wearer of smart glasses and improves the accuracy of the first viewing vector information.

Preferably, according to an example embodiment of the present invention, the computing unit is designed to ascertain the viewing vector of the user's eye on the basis of a comparison of the first viewing vector information with the second viewing vector information. In this context, the comparison of the first viewing vector information with the second viewing vector information provides in particular for checking whether there are deviations between the first viewing vector information and the second viewing vector information. If there is no deviation, it can be assumed that the sensor data is currently error-free. When comparing the viewing vector information, sensor data received in the past and/or viewing vector information ascertained in the past can also be taken into account. If there is a deviation from the viewing vector information ascertained in the past, an error or a change in the state of the eye can also be assumed. In particular, the computing unit is further designed to ascertain a respective quality value of the received first image data and/or the received first rotational speed data of the user's eye and to take these into account when comparing the ascertained viewing vector information. For example, with a camera unit as the first sensor unit, the quality with which the pupil ellipse is found can always be output. With a laser feedback interferometry sensor as the second sensor unit, for example, a similar quality or the quality from the measuring ranges in which the system is located can be determined via the classification reliability of the laser points on the eye. For example, very high absolute rotational speed data and/or unrealistic interval values indicate incorrect measured values.

Preferably, according to an example embodiment of the present invention, the first viewing vector information represents a first viewing vector of the user's eye and the second viewing vector information represents a second viewing vector of the user's eye. The ascertaining of the second viewing vector as second viewing vector information on the basis of the received first rotational speed data of the user's eye is performed in particular by determining the eye surface speed for all sensor values as a projection of the measured speed in the laser beam direction. The viewing vector is then determined, for example, by integrating the surface speed.

Preferably, according to an example embodiment of the present invention, the computing unit is designed to change the first time intervals for recording the first image data, in particular to vary them. The second time intervals in particular remain unchanged or fixed in this context. Preferably, the computing unit is designed to change or vary the first time intervals on the basis of the received first rotational speed data of the user's eye and/or the received first interval information of the second sensor unit relative to the user's eye. In this context, the computing unit is further designed to shorten the first time intervals on the basis of a change in the state of the user's eye detected by means of the received first rotational speed data of the user's eye and/or the received first interval information of the second sensor unit relative to the user's eye. The detected change in the state of the user's eye is, in particular, a blinking user's eye. In this context, the computing unit is also preferably designed to detect such a change in the state of the user's eye on the basis of a comparison of the received first rotational speed data of the user's eye and/or the received first interval information with a first lower and/or a second upper signal threshold value. If the user's eye blinks, for example, the interval measurement values are reduced as the first interval information of an LFI sensor as the second sensor unit so that they fall below the first lower signal threshold value. In such a case, an LFI sensor as a second sensor unit cannot record reliable measurement results to ascertain the viewing vector. In this context, the computing unit is designed to shorten the first time intervals of the first sensor unit so that the imaging, first sensor unit can provide measurement results for optimized ascertaining of the viewing vector at shorter time intervals. Accordingly, the computing unit enables redundant ascertaining of the viewing vector which is as error-free as possible.

Preferably, according to an example embodiment of the present invention, the computing unit is further designed to receive second rotational speed data of the user's eye recorded at the second time interval by means of a further second sensor unit and to ascertain the at least one second viewing vector information of the user's eye on the basis of the received second rotational speed data of the user's eye. The computing unit therefore receives the second rotational speed data simultaneously with the first rotational speed data and uses it to ascertain the second viewing vector information. Here, for example, it is checked whether the rotational speed data of the different second sensor units deviate from each other. Quality values of the received rotational speed data can also be taken into account. Alternatively, the computing unit is designed to receive, by means of the further second sensor unit, second rotational speed data of the user's eye recorded at a third time range, in particular at a third time interval, and to ascertain the at least one second viewing vector information of the user's eye on the basis of the received second rotational speed data of the user's eye. In this case, the rotational speed data of the user's eye is therefore received at different intervals. The ascertaining of the viewing vector is further optimized by receiving and processing rotational speed data from a further second sensor unit.

Preferably, according to an example embodiment of the present invention, the computing unit is designed to ascertain a first eye position associated with the first rotational speed data of the eye recorded by the second sensor unit on the basis of the generated images of the user's eye and to change the operating state of the second sensor unit on the basis of the ascertained viewing vector and the ascertained first eye position. The operating state refers in particular to a switch-on state or a switch-off state of the second sensor unit. The computing unit therefore uses the images of the user's eye to check at which eye position and in which eye state the second sensor unit is currently recording the first rotational speed data. If, for example, it is determined that the user's eye is currently looking at the floor and the second sensor unit is therefore not currently recording the retina but the iris of the user's eye, this second sensor unit can be switched off by the computing unit. Alternatively or additionally, the computing unit is designed to ascertain a second eye position associated with the second rotational speed data of the eye recorded by means of the further second sensor unit on the basis of the generated images of the user's eye and to change the operating state of the further second sensor unit on the basis of the ascertained viewing vector and the ascertained second eye position. Energy can thus be saved.

A further object of the present invention is an optical system for ascertaining a viewing vector of a user of smart glasses. According to an example embodiment of the present invention, the optical system comprises a first sensor unit which is designed to record first image data at a first time interval, in particular in a first time range. In addition, the optical system comprises a second sensor unit which is designed to record first rotational speed data of the user's eye at a second time interval, in particular in a second time range. In this case, the second time interval is smaller, in particular significantly smaller, than the first time interval. The optical system also comprises the computing unit described above.

Preferably, according to an example embodiment of the present invention, the optical system comprises a second light source, in particular an LED unit, which is designed to illuminate the eye. This means that the sensor data can be better recorded using the first and second sensor units.

Preferably, according to an example embodiment of the present invention, the optical system comprises a projector unit with at least one light source for generating at least one light beam, which is in particular invisible to the human eye. In addition, the projector unit comprises a controllable deflection device for the at least one light beam. The controllable deflection device is designed in particular for scanning projection of the light beam. In particular, the controllable deflection device is designed as at least one rotatably mounted micromirror. The first sensor unit is designed as a first laser feedback interferometry sensor with a first photodetector for recording the light backscattered by the user's eye. The first photodetector is preferably integrated into the projector unit. Alternatively, the first photodetector is arranged outside the projector unit, for example in a temple arm.

Alternatively, according to an example embodiment of the present invention, the first sensor unit is preferably designed as a camera unit. In particular, the camera unit is arranged on an eyeglass lens or within an eyeglass lens.

Preferably, according to an example embodiment of the present invention, the optical system comprises at least one further second sensor unit, which is designed to record second rotational speed data of the user's eye at the second time interval, in particular at the second time range, and/or at a third time interval, in particular in a third time range.

Preferably, according to an example embodiment of the present invention, the second sensor unit and/or the at least one further second sensor unit is designed as a two-dimensional camera unit. Such a two-dimensional camera unit refers in particular to an event-based camera or a dynamic vision sensor.

Alternatively, according to an example embodiment of the present invention, the second sensor unit and/or the at least one further second sensor unit is preferably designed as a second laser feedback interferometry sensor with, in particular, an integrated second photodetector. The integrated second photodetector is used in particular to record the light scattered back from the user's eye.

A further object of the present invention are smart glasses comprising the optical system described above. The smart glasses can be designed as augmented reality glasses (AR glasses) or virtual reality glasses (VR glasses).

Furthermore, according to an example embodiment, the present invention comprises a method for ascertaining a viewing vector of a user of smart glasses. The method is carried out in particular by means of the computing unit described above. In one step of the method, first image data recorded by means of a first sensor unit is received at a first time interval, in particular in a first time range. An image of one of the user's eyes is then generated on the basis of the first image data recorded. Furthermore, first rotational speed data of the user's eye recorded by a second sensor unit is received at a second time interval, in particular in a second time range. In this case, the second time interval is smaller, in particular significantly smaller, than the first time interval. In addition, at least a first viewing vector information of the user of the smart glasses is ascertained on the basis of the generated images of the user's eye. Furthermore, at least a second viewing vector information of the user is ascertained on the basis of the received first rotational speed data of the user's eye. The viewing vector of the user's eye is then ascertained on the basis of the ascertained first and/or second viewing vector information.

Preferably, according to an example embodiment of the present invention, the first time interval, in particular the first time range, is in a range from at least 100 ms to at most 1000 ms. Alternatively or additionally, the second time interval, in particular the second time range, is in a range from at least 1 ms to at most 10 ms. Preferably, the third time interval, in particular the third time range, is also in a range of at least 1 ms to at most 10 ms.

DETAILED DESCRIPTION OF EXAMPLE EMBODIMENTS

Figure 1:
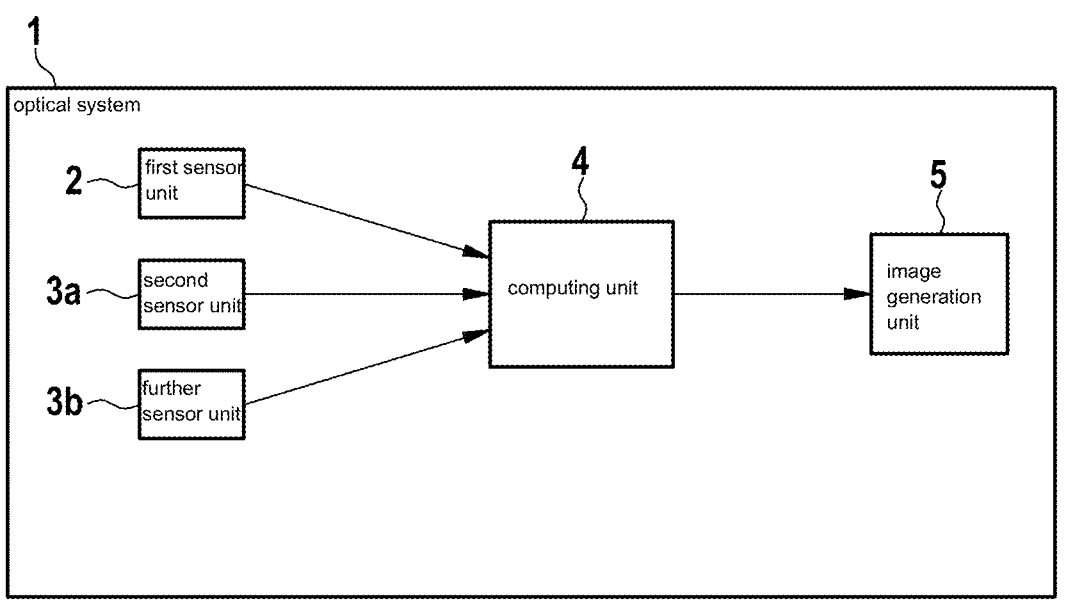
FIG. 1 shows an optical system for ascertaining a viewing vector of a user of smart glasses, according to an example embodiment of the present invention.

FIG. 1 schematically shows an optical system 1 for ascertaining a viewing vector of a user of smart glasses. The optical system 1 comprises a computing unit 4 for ascertaining the viewing vector of the user of the smart glasses. The computing unit 4 is used here to receive first image data recorded by means of a first sensor unit 2 of the optical system 1 at a first time interval, in particular at a first time range, and to generate at least one image of an eye of the user on the basis of the recorded first image data. In addition, the computing unit 4 is used to receive first rotational speed data of the user's eye recorded at a second time interval, in particular in a second time range, by means of a second sensor unit 3*a*. The second time interval is smaller, in particular significantly smaller, than the first time interval. The computing unit 4 is also designed to ascertain at least a first viewing vector information of the user the smart glasses on the basis of the generated images of the user's eye and at least a second viewing vector information of the user's eye on the basis of the received first rotational speed data of the user's eye. In particular, the first viewing vector information represents a first viewing vector of the user's eye and the second viewing vector information represents a second viewing vector of the user's eye. Furthermore, the calculation unit 4 is used to ascertain the viewing vector of the user's eye on the basis of the ascertained first and/or second viewing vector information.

Furthermore, the optional computing unit 4 is designed to receive additionally recorded first interval information of the second sensor unit relative to the user's eye by means of the second sensor unit 3*a* at the second time interval and to ascertain the at least one second viewing vector information of the user's eye on the basis of the received first rotational speed data and the received first interval information of the second sensor unit relative to the user's eye.

The computing unit 4 is further optionally designed to additionally ascertain the first viewing vector information on the basis of the received first rotational speed data and/or the received first interval information of the second sensor unit 2*a* relative to the user's eye.

Furthermore, the computing unit 4 optionally serves to ascertain the viewing vector of the user's eye on the basis of a comparison of the first viewing vector information with the second viewing vector information.

In addition, the computing unit 4 optionally serves to change the first time intervals for recording the first image data, in particular to vary them. In this context, the computing unit 4 is designed to change, in particular to vary, the first time intervals relative to the user's eye on the basis of the received first rotational speed data of the user's eye and/or the received first interval information of the second sensor unit 3*a*. Furthermore, the computing unit 4 is designed to shorten the first time intervals on the basis of a change in the state of the user's eye detected by means of the received first rotational speed data of the user's eye and/or the received first interval information of the second sensor unit 3*a* relative to the user's eye.

Optionally, the computing unit 4 is further designed to receive second rotational speed data of the user's eye recorded by means of a further second sensor unit 3*b* of the optical system 1 at the second time interval, in particular at the second time range, and/or at a third time interval, in particular at a third time range, and to ascertain the at least one second viewing vector information of the user's eye on the basis of the received second rotational speed data of the user's eye.

In this embodiment, the first sensor unit 2 is designed as a camera unit. Furthermore, in this embodiment, the second sensor unit 3*a* and the further second sensor unit 3*b* are designed as a two-dimensional camera unit. The two-dimensional camera unit refers in particular to an event-based camera or a dynamic vision sensor.

In this embodiment, the computing unit 4 is designed to control an image generation unit 5 of the optical system 1 on the basis of the ascertained viewing vector of the user's eye in such a way that the image content generated by the image generation unit is directed onto the retina of the user's eye. In the case of AR glasses, such an image generation unit 5 can be designed as a projector unit, in particular as a laser projector unit. In the case of VR glasses, such an image generation unit 5 can be designed as a display, in particular as a VR display.

Figure 2A:
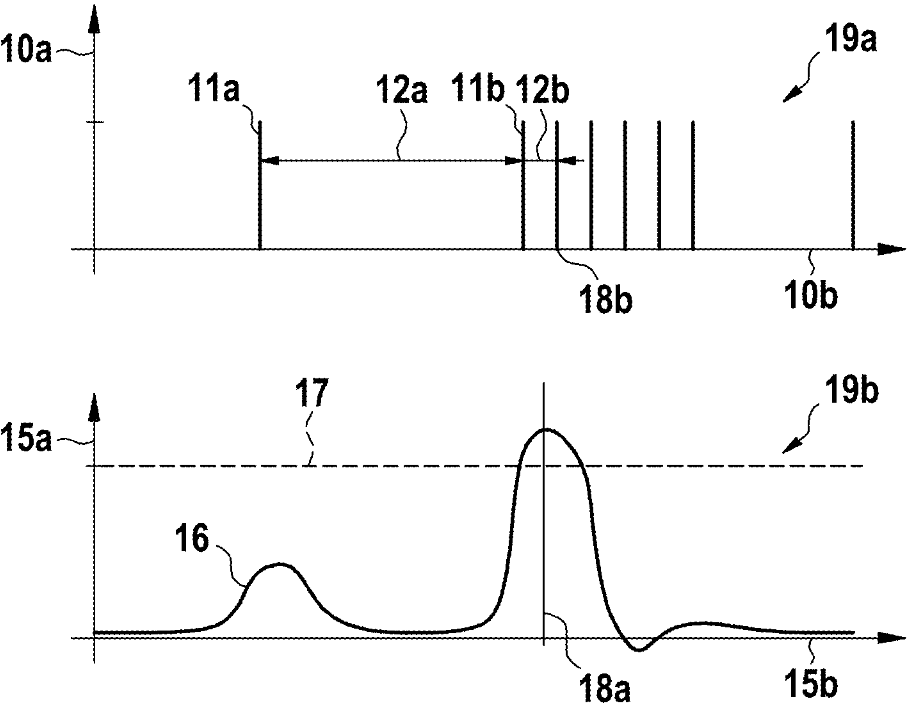
FIGS. 2A to 2C show different examples of received sensor data, according to the present invention.

FIG. 2A shows in the upper xy diagram 19*a* the reception of first image data 11*a* and 11*b* recorded by means of a first sensor unit (not shown here) at a first time interval 12*a*. The time in ms is plotted on the x-axis 10*b* and the frame rate is plotted on the y-axis 10*a*. The lower xy diagram 19*b* of FIG. 2A shows the associated first rotational speed data of the user's eye recorded by a second sensor unit (not shown here). The time in ms is plotted on the x-axis 15*b* and the rotational speed in m/s on the y-axis 15*a*. The signal curve 16 is compared with a second upper signal threshold value 17. With a saccadic eye movement of the user's eye, the second upper signal threshold 17 is exceeded at the first point in time 18*a*. In this case, the measuring accuracy of the second sensor unit, which is designed as an LFI sensor, in particular a static one, is reduced. As can be seen in the upper xy diagram 19*a*, the first time interval 12*b* is shortened at the second point in time 18*b* following the first point in time 18*a*. The sampling rate of the first sensor unit is therefore increased in order to compensate for the measurement inaccuracy of the second sensor unit in the example shown. In this case, the first imaging sensor unit is designed as a camera unit.

Figure 2B:
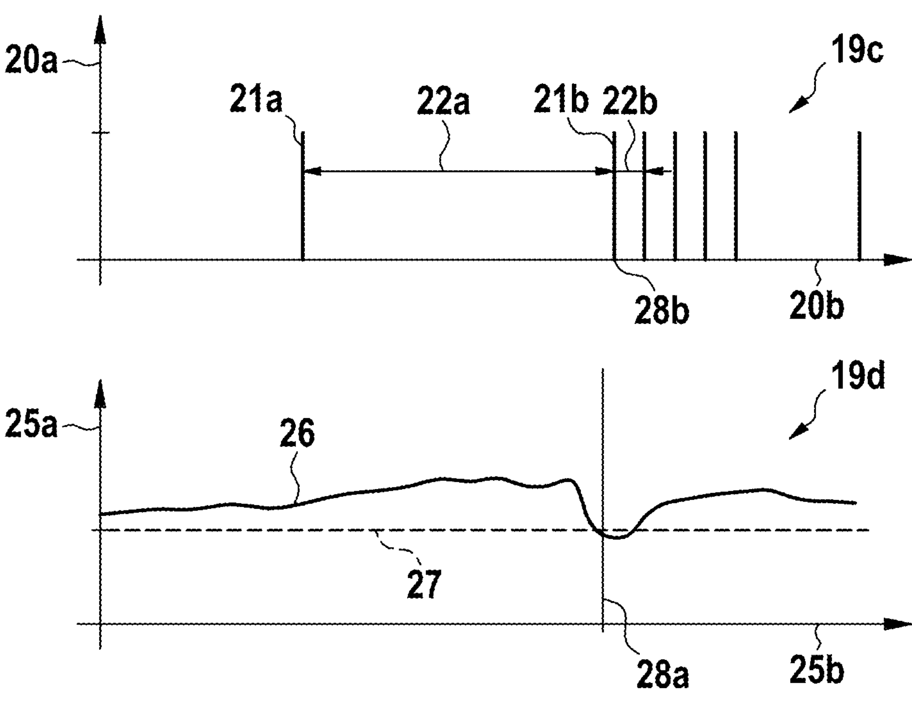

FIG. 2B shows another example in which the first sensor unit (not shown here) compensates for a measurement inaccuracy of the second sensor unit. Here too, the upper xy-diagram 19*c* shows the reception of first image data 21*a* and 21*b* recorded by means of a first sensor unit (not shown here) at a first time interval 22*a*. The time in ms is plotted on the x-axis 20*b* and the frame rate is plotted on the y-axis 20*a*. On the lower xy diagram 19*d* of FIG. 2B, the associated first interval values of the second sensor unit relative to the user's eye, recorded by means of a second sensor unit (not shown here), are plotted. The time in ms is plotted on the x-axis 25*b* and the interval values in m are plotted on the y-axis 25*a*. The signal curve 26 is compared with a first lower signal threshold value 27. In the case shown, the user's eye blinks at point in time 28, so the recorded interval values fall below the first signal threshold 27. As can be seen in the upper xy diagram 19*c*, the first time interval 22*b* is then shortened at the second point in time 28*b* following the first point in time 28*a*. The sampling rate of the first sensor unit is therefore increased again in order to compensate for the measurement inaccuracy of the second sensor unit in the example shown.

Figure 2C:
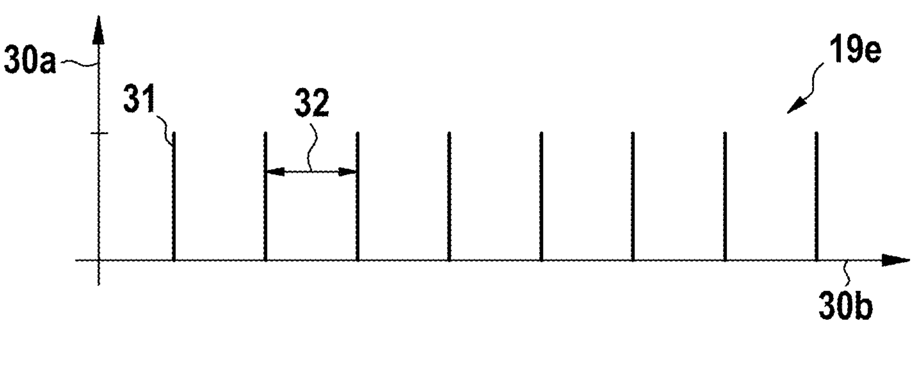
Figure 2C:
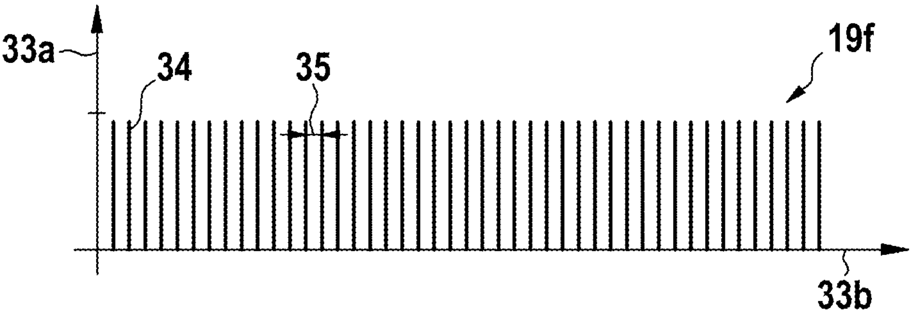

FIG. 2C shows the reception times of the first sensor unit and second sensor unit in normal operation, in which both the first sensor unit and second sensor unit can record the sensor data without interference. In the upper xy diagram 19*e*, the time in ms is plotted on the x-axis 30*b* and the signal intensity on the y-axis 30*a*. Similarly, in the lower xy diagram 19*f*, the time in ms is plotted on the x-axis 33*b* and the signal intensity on the y-axis 33*a*. In the example shown, the first time interval 32 is 500 ms and the second time interval 35 is 5 ms. The second time interval 35 is therefore considerably smaller than the first time interval 32.

Figure 3A:
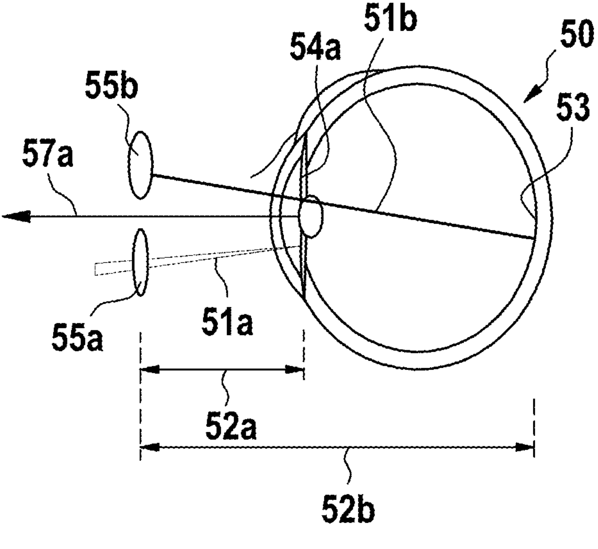
FIGS. 3A to 3C show examples of rotational speed data of the eye recorded by means of second sensor units on the basis of the current viewing vector, according to the present invention.

FIG. 3A shows the recording of first interval information 52*a* of a second sensor unit 55*a* relative to the user's eye 50 by means of the second sensor unit 55*a*. In addition, a further second sensor unit 55*b* is provided, which records second interval information 52*b* of the further second sensor unit 55*b* relative to the user's eye 50. The two sensor units 55*a* and 55*b* are designed as LFI sensors, each with an integrated second photodetector (not shown here). In this embodiment example, the user's viewing vector 57*a* points in a horizontal direction, whereby the second laser beams 51*a* of the second sensor unit 55*a* are backscattered by the iris 54*a* of the user's eye as the first eye position. These sensor data can therefore not be used to ascertain the viewing vector 57*a*, or only with a high degree of inaccuracy. The second sensor unit 55*a* can be switched off accordingly by means of the computing unit (not shown here). The third laser beams 51*b* of the further second sensor unit 55*b* in turn reach the retina 53 as the second eye position and these sensor data can thus be used to ascertain the viewing vector 57*a*. The further second sensor unit 55*b* can therefore remain switched on.

Figure 3B:
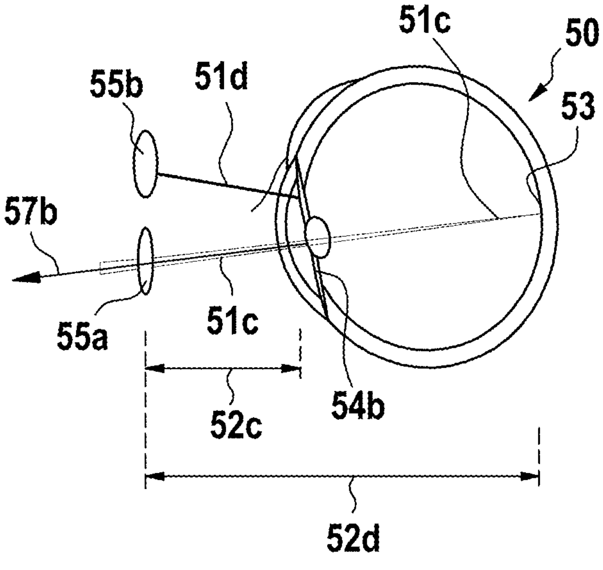

FIG. 3B shows another eye state in which the viewing vector is tilted slightly downwards. In this case, the second laser beams 51*c* of the second sensor unit 55*a* reach the retina as the first eye position, whereby the recorded first interval information 52*d* can be used to ascertain the viewing vector 57*b*. In contrast, the third laser beams 51*d* of the further second sensor unit 55*b* are scattered back through the iris 54*b* as the second eye position in this embodiment example. The recorded second interval information 52*c* can therefore not be used to ascertain the viewing vector 57*b*, or only with a high degree of inaccuracy. As already described for FIG. 3A, the computing unit (not shown here) can in this case switch off the other second sensor unit 55*b* to save energy, while the second sensor unit 55*a* remains switched on.

Figure 3C:
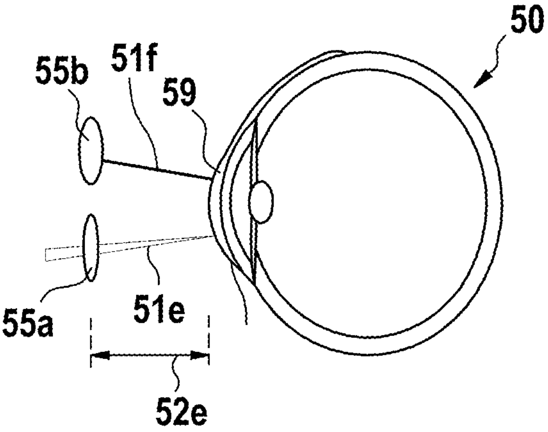

FIG. 3C shows an embodiment example in which the user's eye 50 is closed. Accordingly, both the second laser beams 51*e* of the second sensor unit 55*a* and the third laser beams 51*f* of the further second sensor unit 55*a* are scattered back by the eyelid 59. The first and second interval information 52*e* thus recorded cannot be used to ascertain the viewing vector or a closed user's eye 50 can be inferred accordingly. Accordingly, in this embodiment example, the computing unit (not shown here) can switch off both the second sensor unit 55*a* and the further second sensor unit 55*b* in order to save energy.

Figure 4:
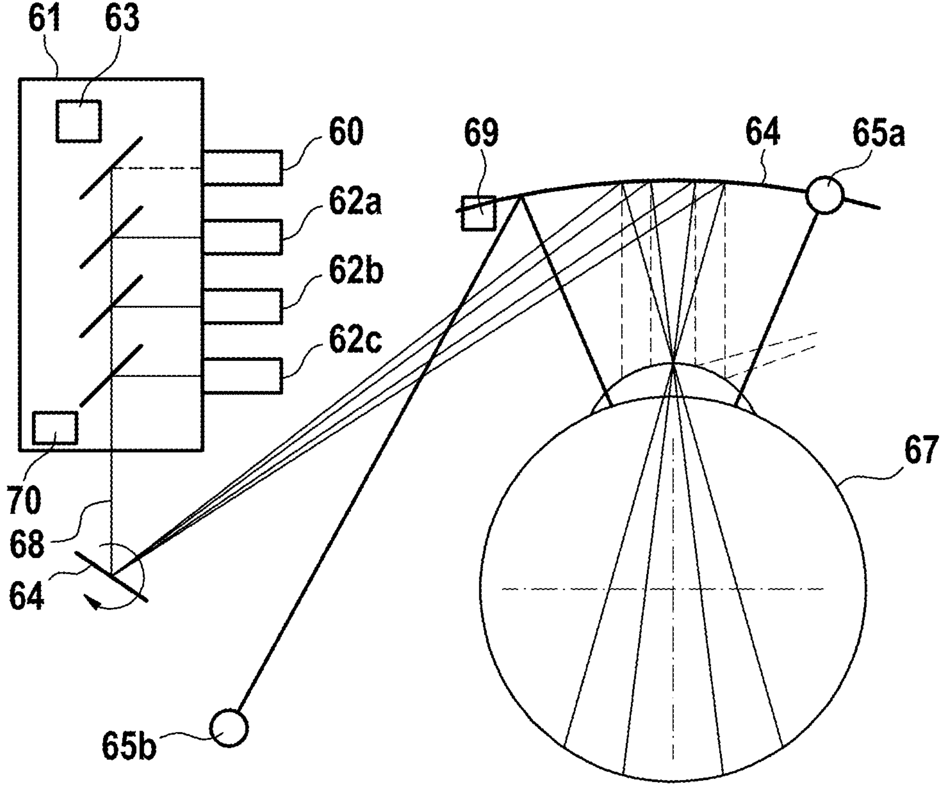
FIG. 4 shows components of smart glasses, according to an example embodiment of the present invention.

FIG. 4 shows schematic components of smart glasses, which are designed as AR glasses. The smart glasses comprise an optical system for ascertaining a viewing vector of the user of the smart glasses. The optical system comprises a projector unit 61 with an infrared light source 60, as well as a red light source 62*a*, a blue light source 62*b* and a green light source 62. Both the infrared light beam generated and the visible light beams generated by the red light source 62*a*, the blue light source 62*b* and the green light source 62*c* are projected onto the eyeglass lens 64 as a common light beam 68 with a controllable deflection device 64 in a scanning manner. While the infrared light beam is used to scan the user's eye 67, the other visible light beams are used to project image content onto the user's eye 67. A holographic optical element, not shown, is arranged on the eyeglass lens 64, which deflects the incoming light rays 68 in the direction of the user's eye 67. A second LFI sensor 65*a* is arranged on the eyeglass lens 64 as a second sensor unit for recording the light 71*a* emitted by the second LFI sensor 65*a* and scattered back by the user's eye. A further second LFI sensor 65*b* is arranged on a temple arm (not shown here) to record the light 71*b* emitted by the further second LFI sensor 65*b* and scattered back by the user's eye 67. The projector unit 61 comprises a first LFI sensor 70 as the first sensor unit. The first LFI sensor 70 is designed as a first photodetector. The first LFI sensor 70 records the infrared light backscattered by the user's eye 67. Due to the scanning projection of the infrared light beam over the user's eye 67, the first LFI sensor is designed as an imaging sensor. In addition, in this embodiment example, the computing unit 63 for ascertaining a viewing vector of a user of smart glasses is integrated into the projector unit 61.

Figure 5:
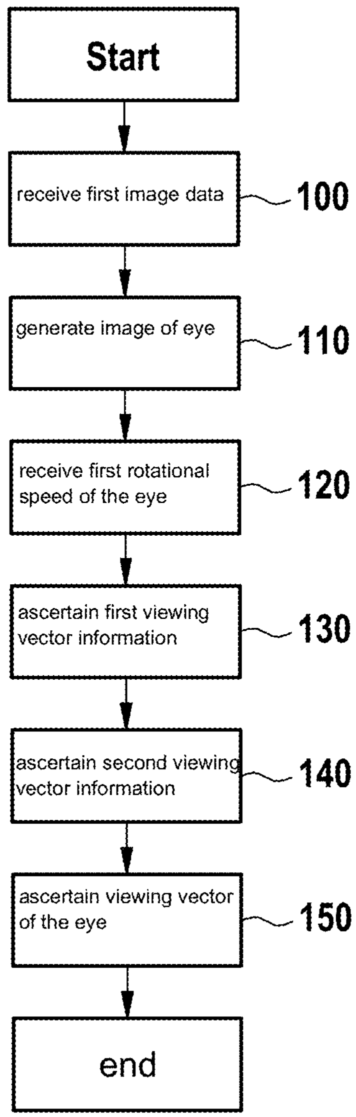
FIG. 5 shows a method for ascertaining a viewing vector of a user of smart glasses, according to an example embodiment of the present invention.

FIG. 5 uses a flow chart to show a method for ascertaining a viewing vector of a user of smart glasses. The method is carried out in particular by means of the computing unit described in FIG. 1. Here, in a method step 100, first image data recorded by means of a first sensor unit is received at a first time interval, in particular at a first time range. Furthermore, in a method step 110, an image of an eye of the user is generated on the basis of the recorded first image data. In a subsequent method step 120, first rotational speed data of the user's eye recorded by means of a second sensor unit is received at a second time interval, in particular at a second time range. The second time interval is smaller, in particular significantly smaller, than the first time interval. In a method step 130, at least a first viewing vector information of the user of the smart glasses is ascertained on the basis of the generated images of the user's eye. In a subsequent method step 140, at least a second viewing vector information of the user is ascertained on the basis of the received first rotational speed data of the user's eye. In a subsequent method step 150, the viewing vector of the user's eye is ascertained on the basis of the ascertained first and/or second viewing vector information. Thereupon, the method ends.

The invention claimed is:

1. A computing unit for ascertaining a viewing vector of a user of smart glasses, wherein the computing unit is configured to:

receive first image data recorded using a first sensor unit at a first time interval including at a first time range, and to generate at least one image of an eye of the user based on the recorded first image data;

receive first rotational speed data of the user's eye recorded using a second sensor unit at a second time interval including a second time range, wherein the second time interval is smaller than the first time interval;

ascertain at least first viewing vector information of the user of the smart glasses based on the generated at least one image of the user's eye, and ascertain at least second viewing vector information of the user's eye based on the received first rotational speed data of the user's eye; and ascertain the viewing vector of the user's eye based on the ascertained at least first and/or at least second viewing vector information, wherein the computing unit is configured to change the first time interval for recording the first image data, and wherein the computing unit is configured to change the first time interval based on the received first rotational speed data of the user's eye and/or first interval information of the second sensor unit relative to the user's eye.

2. The computing unit according to claim 1, wherein the computing unit is configured to additionally ascertain the at least first viewing vector information based on the received first rotational speed data and/or first interval information of the second sensor unit relative to the user's eye.

3. The computing unit according to claim 1, wherein the computing unit is configured to ascertain the viewing vector of the user's eye based on a comparison of the at least first viewing vector information with the at least second viewing vector information.

4. The computing unit according to claim 1, wherein the at least first viewing vector information represents a first viewing vector of the user's eye and the at least second viewing vector information represents a second viewing vector of the user's eye.

5. The computing unit according to claim 1, wherein the computing unit is configured to shorten the first time interval in dependence of a change in state of the user's eye, wherein the change in the state is detected using the received first rotational speed data of the user's eye and/or the first interval information of the second sensor unit relative to the user's eye.

6. A computing unit for ascertaining a viewing vector of a user of smart glasses, wherein the computing unit is configured to:

receive first image data recorded using a first sensor unit at a first time interval including at a first time range, and to generate at least one image of an eye of the user based on the recorded first image data;

receive first rotational speed data of the user's eye recorded using a second sensor unit at a second time interval including a second time range, wherein the second time interval is smaller than the first time interval;

ascertain at least first viewing vector information of the user of the smart glasses based on the generated at least one image of the user's eye, and ascertain at least second viewing vector information of the user's eye based on the received first rotational speed data of the user's eye; and ascertain the viewing vector of the user's eye based on the ascertained at least first and/or at least second viewing vector information, wherein the computing unit is configured to receive first interval information of the second sensor unit relative to the user's eye, the first interval information being additionally recorded using the second sensor unit at the second time interval, and to ascertain the at least second viewing vector information of the user's eye based on the received first rotational speed data and the received first interval information of the second sensor unit relative to the user's eye.

7. A computing unit for ascertaining a viewing vector of a user of smart glasses, wherein the computing unit is configured to:

receive first image data recorded using a first sensor unit at a first time interval including at a first time range, and to generate at least one image of an eye of the user based on the recorded first image data;

receive first rotational speed data of the user's eye recorded using a second sensor unit at a second time interval including a second time range, wherein the second time interval is smaller than the first time interval;

ascertain at least first viewing vector information of the user of the smart glasses based on the generated at least one image of the user's eye, and ascertain at least second viewing vector information of the user's eye based on the received first rotational speed data of the user's eye; and ascertain the viewing vector of the user's eye based on the ascertained at least first and/or at least second viewing vector information, wherein the computing unit is configured to receive second rotational speed data of the eye of the user using a further second sensor unit at the second time interval in the second time range and/or a third time interval including a third time range, and to ascertain the at least second viewing vector information of the user's eye based on the received second rotational speed data of the user's eye.

8. The computing unit according to claim 7, wherein the computing unit is configured to ascertain based on the generated at least one image of the user's eye a first eye position associated with the received first rotational speed data of the eye, which is recorded using the second sensor unit, and/or to ascertain based on the generated at least one image of the user's eye a second eye position associated with the second rotational speed data of the eye, which is recorded using the further second sensor unit, and to change an operating state of the second and/or the second sensor unit based on the ascertained viewing vector, and also the ascertained first and/or second eye position.

9. An optical system for ascertaining a viewing vector of a user of smart glasses, comprising:

a first sensor unit configured to record first image data at a first time interval including at a first time range;

a second sensor unit configured to record first rotational speed data of the user's eye at a second time interval including at a second time range, wherein the second time interval is smaller than the first time interval; and a computing unit configured to:

receive the first image data recorded using the first sensor unit at the first time interval including at the first time range, and to generate at least one image of an eye of the user based on the recorded first image data, receive first rotational speed data of the user's eye recorded using the second sensor unit at the second time interval including the second time range, ascertain at least first viewing vector information of the user of the smart glasses based on the generated at least one image of the user's eye, and ascertain at least second viewing vector information of the user's eye based on the received first rotational speed data of the user's eye, and ascertain the viewing vector of the user's eye based on the ascertained at least first and/or at least second viewing vector information, wherein the computing unit is configured to change the first time interval for recording the first image data, and wherein the computing unit is configured to change the first time interval based on the received first rotational speed data of the user's eye and/or first interval information of the second sensor unit relative to the user's eye.

10. The optical system according to claim 9, wherein the optical system includes a projector unit with at least one light source configured to generate at least one light beam invisible to a human eye, and with a controllable deflection device for the at least one light beam for scanning projection of the light beam, wherein the first sensor unit is a first laser feedback interferometry sensor with a first photodetector for recording light backscattered by the user's eye.

11. The optical system according to claim 9, wherein the first sensor unit is a camera unit.

12. The optical system according to claim 9, wherein the second sensor unit and/or the at least one further second sensor unit is a two-dimensional camera unit including an event-based camera or a dynamic vision sensor.

13. The optical system according to claim 9, wherein the second sensor unit and/or the at least one further second sensor unit is a second laser feedback interferometry sensor with an integrated second photodetector.

14. An optical system for ascertaining a viewing vector of a user of smart glasses, comprising:

a first sensor unit configured to record first image data at a first time interval including at a first time range;

a second sensor unit configured to record first rotational speed data of the user's eye at a second time interval including at a second time range, wherein the second time interval is smaller than the first time interval; and a computing unit configured to:

receive the first image data recorded using the first sensor unit at the first time interval including at the first time range, and to generate at least one image of an eye of the user based on the recorded first image data, receive first rotational speed data of the user's eye recorded using the second sensor unit at the second time interval including the second time range, ascertain at least first viewing vector information of the user of the smart glasses based on the generated at least one image of the user's eye, and ascertain at least second viewing vector information of the user's eye based on the received first rotational speed data of the user's eye, and ascertain the viewing vector of the user's eye based on the ascertained at least first and/or at least second viewing vector information, wherein the optical system has at least one further second sensor unit which is configured to record second rotational speed data of the user's eye at the second time interval at the second time range and/or at a third time interval at a third time range.

15. Smart glasses, comprising:

an optical system for ascertaining a viewing vector of a user of the smart glasses, including:

a first sensor unit configured to record first image data at a first time interval including at a first time range;

a second sensor unit configured to record first rotational speed data of the user's eye at a second time interval including at a second time range, wherein the second time interval is smaller than the first time interval; and a computing unit configured to:

receive the first image data recorded using the first sensor unit at the first time interval including at the first time range, and to generate at least one image of an eye of the user based on the recorded first image data, receive the first rotational speed data of the user's eye recorded using the second sensor unit at the second time interval including the second time range, ascertain at least first viewing vector information of the user of the smart glasses based on the generated at least one image of the user's eye, and ascertain at least second viewing vector information of the user's eye based on the received first rotational speed data of the user's eye, and ascertain the viewing vector of the user's eye based on the ascertained at least first and/or at least second viewing vector information, wherein the computing unit is configured to change the first time interval for recording the first image data, and wherein the computing unit is configured to change the first time interval based on the received first rotational speed data of the user's eye and/or first interval information of the second sensor unit relative to the user's eye.

16. A method for ascertaining a viewing vector of a user of smart glasses, the method comprising the following steps:

receiving first image data recorded at a first time interval at a first time range, using a first sensor unit;

generating in each case at least one image of an eye of the user based on the recorded first image data, and receiving first rotational speed data of the user's eye recorded at a second time interval at a second time range, using a second sensor unit, wherein the second time interval is smaller than the first time interval;

ascertaining at least first viewing vector information of the user of the smart glasses on the basis of the generated at least one image of the user's eye;

ascertaining at least second viewing vector information of the user based on the received first rotational speed data of the user's eye; and ascertaining the viewing vector of the user's eye based on the ascertained at least first and/or the ascertained at least second viewing vector information, wherein the method further comprises changing the first time interval for recording the first image data based on the received first rotational speed data of the user's eye and/or first interval information of the second sensor unit relative to the user's eye.

17. A method for ascertaining a viewing vector of a user of smart glasses, the method comprising the following steps:

receiving first image data recorded at a first time interval at a first time range, using a first sensor unit;

generating in each case at least one image of an eye of the user based on the recorded first image data, and receiving first rotational speed data of the user's eye recorded at a second time interval at a second time range, using a second sensor unit, wherein the second time interval is smaller than the first time interval;

ascertaining at least first viewing vector information of the user of the smart glasses on the basis of the generated at least one image of the user's eye;

ascertaining at least second viewing vector information of the user based on the received first rotational speed data of the user's eye; and ascertaining the viewing vector of the user's eye based on the ascertained at least first and/or the ascertained at least second viewing vector information, wherein the first time interval at the first time range is in a range from at least 100 ms to at most 1000 ms, and/or the second time interval at the second time range, is in a range from at least 1 ms to at most 10 ms.

* * * * *